Jan. 13, 1953 J. M. MILLER 2,624,946
TELESCOPE GUN SIGHT MOUNT
Filed April 30, 1946
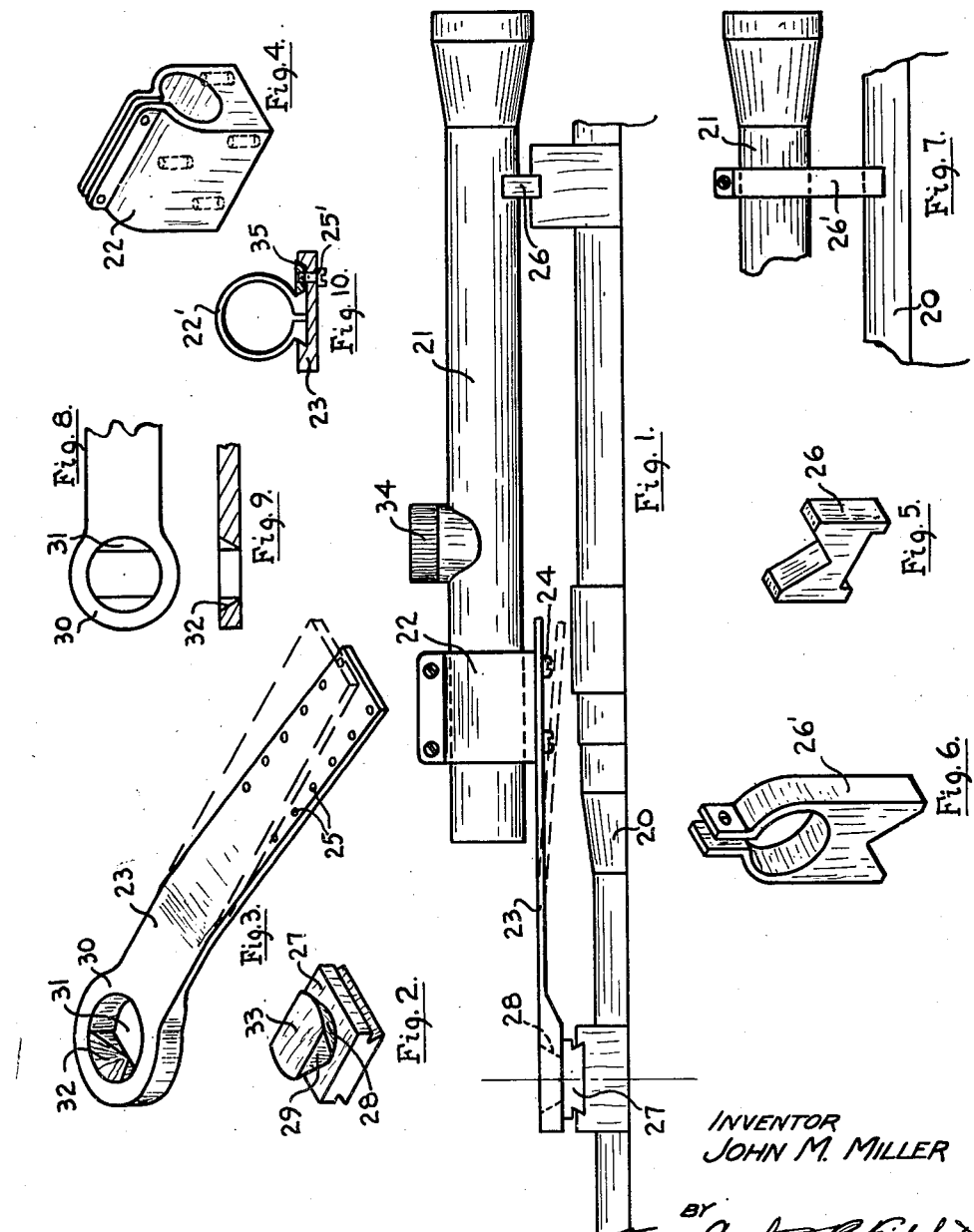
INVENTOR
JOHN M. MILLER
BY Carlton B. Fitchett
AGENT Patented Jan. 13, 1953

2,624,946

UNITED STATES PATENT OFFICE 2,624,946

TELESCOPE GUN SIGHT MOUNT

John M. Miller, Poughkeepsie, N. Y.

Application April 30, 1946, Serial No. 666,142

2 Claims. (Cl. 33—50)

This invention relates to means for affixing a telescope sight on a gun.

It is an object of the invention to provide a fixture whereby the telescopic sight can be removed from or attached to a gun quickly and easily.

It is another object of the invention to provide in the fixture, means whereby the telescopic sight will be automatically returned to a correct alignment relative to a gun barrel, each time the sight is placed on the gun.

A further object of the invention is to provide a fixture which will be easy to manufacture and simple to use.

Other objects of the invention will be apparent from the following description and drawing which illustrate the principles of the device.

In the drawing:

Figure 1 is a side elevational view of the fixture attached to the telescope and mounted on a gun.

Figure 2 is an isometric view of the pivot block.

Figure 3 is an isometric view of the spring biased mounting element.

Figure 4 is an isometric view of the clamp by which the telescope is attached to the mounting element.

Figure 5 is an isometric view of the V-block support for the eye-piece end of the telescope.

Figure 6 is an isometric view of another form of the telescope eye-piece end support.

Figure 7 is a side elevation of a portion of a telescope and gun barrel showing a method of using the support means of Figure 6.

Figures 8 and 9 are top plan and sectional views respectively of the demountable means incorporated in the pivot end of the spring biased mounting element of Figure 3.

Figure 10 is a view, partly in section of an alternative method of attaching the telescope to the mounting element.

In the illustrated embodiment of this invention, 20 respresents a gun barrel to which telescope 21 is demountably attached. Clamp 22 (Figure 4) is affixed to the forward end of the telescope and that in turn is mounted on the spring biased mounting element 23 by suitable means such as screws 24 through holes 25. Either of the V-blocks 26 or 26' (Figure 6) are mounted to cooperate with the eye-piece end of telescope and act as a rear end support for the same. Having completed the assembly thus far, the location of the pivot block 27 may be determined, and that block permanently affixed to the gun barrel 20 in any suitable manner. A dove-tail joint is illustrated but other means are frequently used. The top surface of the pivot block is formed as a frustrum of a cone 28 with two diametrically opposite parallel sides 29 cut away as best shown in Figure 2.

The pivot end of the spring-biased mounting element 23 is formed with a circular enlargement 30 having a circular opening 31 therethrough with the sides thereof forming a frustrum of a cone 32 (Figure 9). Two side portions of the frustrum are cut away to form a through opening complementary to the top surface 33 of the pivot block 27. The through opening is made with its longest dimension at right angles to the longest dimension of the top surface 33 of the pivot block when the element 23 is parallel to the longitudinal axis of the gun barrel 20.

With the position of the pivot block 27 being permanently fixed, the telescope, with the element 23 attached to one end and the V-block mounts 26 or 26' attached to or cooperating with the other end, may be attached and removed from the gun at will. This is accomplished by raising the telescope 21 from the V-block 26 or gun barrel 20 against the tension of the spring biased element 23 and turning the whole assembly to a position (in the embodiment shown, 90 degrees) when the through portion of opening 31 will be free to raise off the pivot block 27. When the telescope is attached to the gun, the bias (indicated by dotted lines in Figures 1 and 3) acting through the V-block mount on the eyepiece end of the telescope will always return the longitudinal axis of the gun and the telescope to the same relative positions.

In the embodiment shown, the spring bias in element 23 is accomplished by bending the piece before a heat treatment is given to the same. The cooperating surfaces of the cone frustrums heretofore described in element 23 and pivot block 27 serve to hold the axis of the pivot joint perpendicular to the longitudinal axis of the gun barrel. In the telescope illustrated, adjustment of the cross-hairs in the same is accomplished by usual means designated at 34.

Figure 10 illustrates another method of attaching the telescope to the mounting element. A slot, undercut on one side and overcut on the other, is cut in the end of element 23 at or near the area containing holes 25 in Figure 3. A split ring 22' is placed around the telescope barrel and the ends of the ring are shaped in the manner of a dove-tail joint. The ring 22' is locked in place by means of one screw 25' passing through one hole 25 in the mounting element 23 and engaging taper key 35 which forces the assembly into a tight relation.

From the foregoing description it can be seen that a fixture has been provided whereby the telescope and fixture can be carried as a complete unit separate from the gun and attached at will. When mounted on the gun it will always return to the same position relative to the longitudinal axis of the gun and may be removed therefrom, leaving no portion of the fixture which will interfere with the normal use of the same, should it be desired to use the gun without the telescopic sight.

Having described the invention, what is claimed as new is:

I claim:

1. In a telescope sight mounting, a telescope adapted to be secured, as hereinafter specified, at only its forward end portion to the gun barrel and a rest for the telescope at its rearward eye-piece end by which that end is removably supported from the gun barrel; said rest comprising a supporting device, between the telescope and the gun-barrel, secured only to one of the two last named elements, restraining the telescope from lateral movement on the gun-barrel but allowing it to be freely lifted from its supported position; the mounting at its other end comprising a spring arm adapted to be pivotally supported from the gun-barrel on a vertical axis at a locus forward of the front end of the telescope and swingable on its pivot in position to be slidably removed from its pivotal support, said spring arm, when in operative position, extending rearward and terminating a substantial distance forward of the eye-piece end of the telescope and having but one connection therewith, namely, a clamp enclosing the telescope relatively near its forward end and adjustable along and supported solely by the free end part of the spring arm, said spring arm, when in operative position, pressing the forward end of the telescope toward the gun-barrel and holding the telescope in parallel relation therewith, in sighting position, whereby, by sliding the spring arm on its pivot, lifting the eye-piece end of the telescope and swinging the latter into position in approximate parallelism with the gun barrel and releasing it, the mounting will automatically assume proper sighting position, and whereby, by lifting the eye-piece end of the telescope and swinging it on its pivot and sliding it thereon the entire mounting is removed from the gun, leaving no fixture interfering with the use of the gun without the telescope sight.

2. A telescope mounting apparatus for a gun, said apparatus comprising a normally downwardly directed spring arm and a tubular clamp at one end of the arm for engaging and connecting the front end of a telescope tube to said gun, a telescope tube supporting member for removable connection to said gun and serving to support the rear end of said telescope tube, said spring arm being operative to effect a spring-like engagement between said telescope tube and said supporting member, the normal configuration of said spring arm being bowed, the action of connecting the telescope tube front end to the gun, straightening said spring arm so as to exert a downward thrust on the rear end of said telescope tube, a connector at the other end of the spring arm, and the tubular clamp embracing the front end of the telescope tube, and spring arm, clamp and tube being in substantially horizontal alignment when the apparatus is installed on a gun.

JOHN M. MILLER.

REFERENCES CITED

The following references are of record in the file of this patent:

UNITED STATES PATENTS

| Number | Name | Date |
| --- | --- | --- |
| 1,418,935 | Knoble | June 6, 1922 |
| 2,125,828 | Turner | Aug. 2, 1938 |
| 2,187,054 | Redfield | Jan. 16, 1940 |
| 2,202,000 | Gray | May 28, 1940 |
| 2,365,976 | Sorensen | Dec. 26, 1944 |

FOREIGN PATENTS

| Number | Country | Date |
| --- | --- | --- |
| 540,826 | Great Britain | 1941 |